United States Patent
Madhusudan

(10) Patent No.: US 12,129,046 B2
(45) Date of Patent: Oct. 29, 2024

(54) PASSIVE LIGHTNING PROTECTION SYSTEMS AND METHODS

(71) Applicant: Bell Textron Inc., Fort Worth, TX (US)

(72) Inventor: Phalgun Madhusudan, Urbana, IL (US)

(73) Assignee: Textron Innovations Inc., Providence, RI (US)

( * ) Notice: Subject to any disclaimer, the term of this patent is extended or adjusted under 35 U.S.C. 154(b) by 405 days.

(21) Appl. No.: 16/866,834

(22) Filed: May 5, 2020

(65) Prior Publication Data

US 2021/0347496 A1 Nov. 11, 2021

(51) Int. Cl.
- *B64D 45/02* (2006.01)
- *B32B 37/12* (2006.01)
- *B32B 37/24* (2006.01)
- *B64C 1/12* (2006.01)
- *C09D 5/24* (2006.01)
- *C09K 3/16* (2006.01)

(52) U.S. Cl.
CPC .............. *B64D 45/02* (2013.01); *B32B 37/12* (2013.01); *B64C 1/12* (2013.01); *C09D 5/24* (2013.01); *C09K 3/16* (2013.01); *B32B 2037/243* (2013.01); *B32B 2305/38* (2013.01); *B32B 2311/00* (2013.01)

(58) Field of Classification Search
CPC .......... B32B 2037/243; B32B 2305/38; B32B 2311/00; B32B 37/12; B64C 1/12; B64D 45/02; C09D 5/24; C09K 3/16
See application file for complete search history.

(56) References Cited

U.S. PATENT DOCUMENTS

| | | | | |
|---|---|---|---|---|
| 4,186,237 A | * | 1/1980 | Propp | B64D 45/02 427/124 |
| 8,045,314 B2 | * | 10/2011 | Ibok | H05F 7/00 361/126 |
| 2005/0236268 A1 | * | 10/2005 | Mishima | C23C 18/1632 257/E21.585 |
| 2010/0264665 A1 | * | 10/2010 | Hebert | B64C 1/12 290/55 |
| 2016/0362565 A1 | * | 12/2016 | Fornes | H05K 9/0079 |

OTHER PUBLICATIONS

Karman vortex street; https://en.wikipedia.org/wiki/K%C3%A1rm%C3%A1n_vortex_street#/media/File:Karmansche_Wirbelstr_kleine_Re.JPG; May 23, 2015.

Breakdown Voltage vs. Pressure, Paschen's Law and The Paschen Curve; https://www.duniway.com/images/_pg/paschen-curve.pdf; Apr. 12, 2020.

(Continued)

*Primary Examiner* — George R Koch
*Assistant Examiner* — Jimmy R Smith, Jr.
(74) *Attorney, Agent, or Firm* — Akona IP PC

(57) ABSTRACT

According to one implementation of the present disclosure, a method is disclosed. The method includes forming one or more aircraft surfaces from at least one of one or more metal materials or metal composite materials; and forming a surface coating, at least partially covering the one or more aircraft surfaces, with one or more materials above a dielectric strength threshold.

18 Claims, 5 Drawing Sheets

810 — PROVIDE ONE OR MORE METAL OXIDE MATERIALS TO AT LEAST PARTIALLY COAT ONE OR MORE METAL MESHES FORMING A VARISTOR LAYER

820 — PROVIDE ONE OR MORE AIRCRAFT SURFACES COUPLED TO THE ONE OR MORE AT LEAST PARTIALLY COATED METAL MESHES, WHERE CURRENT IS CONDUCTED FROM THE VARISTOR LAYER TO THE ONE OR MORE AT LEAST PARTIALLY COATED METAL MESHES

(56) References Cited

OTHER PUBLICATIONS

6/15 SC IL close lightning/severe storms; http://stormhighway.com/blog2010/june1510a.php; Jun. 15, 2010.
Rayleigh-Taylor instability; https://en.wikipedia.org/wiki/Rayleigh%E2%80%93Taylor_instability; Apr. 16, 2020.
Rayleigh-Bénard convection; https://en.wikipedia.org/wiki/Rayleigh%E2%80%93%C3%A9nard_convection; Apr. 18, 2020.

* cited by examiner

PASSIVE LIGHTNING PROTECTION SYSTEMS AND METHODS

STATEMENT REGARDING FEDERALLY SPONSORED RESEARCH OR DEVELOPMENT

Not applicable.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Aircrafts are often vulnerable to lightning strikes because they are made of conductive materials. Flying an aircraft into a storm often provides a conductive path for lightning discharges (i.e., leader attachment) to occur and hence, the likelihood of lightning strike increases. Accordingly, making aircraft surfaces to better avoid and minimize lightning impact is an ongoing need in the art.

SUMMARY

According to one implementation of the present disclosure, a method is disclosed. The method includes forming one or more aircraft surfaces from at least one of one or more metal materials or metal composite materials; and forming a surface coating, at least partially covering the one or more aircraft surfaces, with one or more materials above a dielectric strength threshold.

According to another implementation of the present disclosure, another method is disclosed. The method includes forming one or more aircraft surfaces; at least partially coating the one or more metal meshes with one or more metal oxide materials; and adjoining the one or more metal meshes to the one or more at least partially coated the metal meshes.

According to a third implementation of the present disclosure, a method of energy attenuation of an aircraft surface is disclosed. The method includes providing one or more metal oxide materials to at least partially coated with one or more metal meshes to form a varistor layer; and providing one or more aircraft surfaces to be coupled to the at least partially coated metal meshes. Also, current may be conducted from the varistor layer to the at least partially coated metal meshes.

The above-referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

Figure 1:
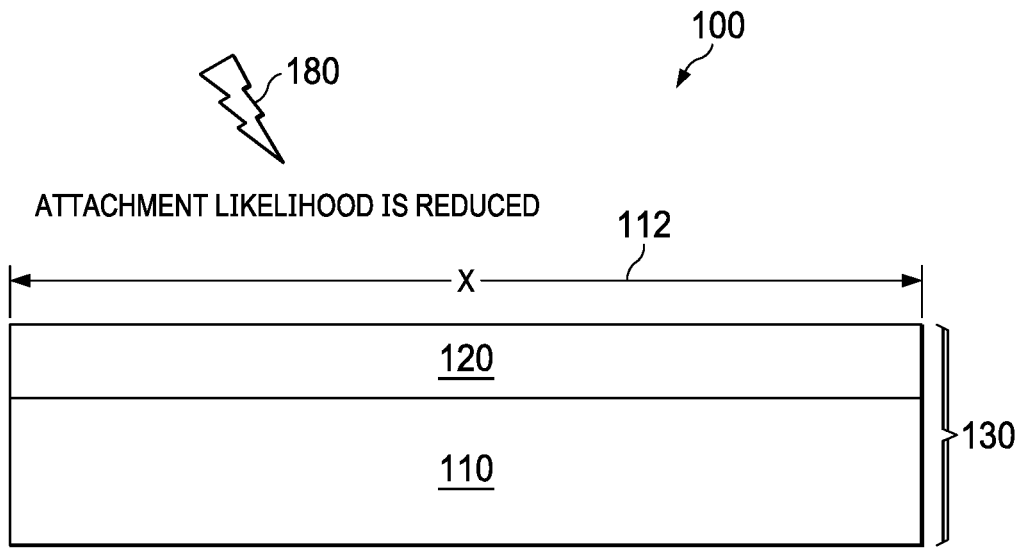
FIG. 1 illustrates a diagram in accordance with implementations of various techniques described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

While flying near storms, aircrafts may often be susceptible to lightning strikes. Lightning strikes occur when in a lightning environment, surfaces of an aircraft become sufficiently charged such that both metallic and dielectric parts of the aircraft are temporarily polarized. Systems and methods of the present disclosure include aircraft improvements to passively avoid and reduce the impact of a full lightning discharge path on or near the aircraft. Accordingly, aircrafts may safely navigate airspace in the proximity of storms.

Lightning strikes occur when the formation of tiny channels of ionized air (i.e., ionized plasma channels) are stabilized with electric and magnetic fields (that may be generated by the movement of the ionized plasma channels through atmospheric air). This stabilization is known as the formation of "stable streamers". Next, as stable streamers come in contact (i.e., connect) with "lightning leaders" (i.e., ionized plasma columns/channels generated when metallic and dielectric surfaces of an aircraft surface are sufficiently charged), "leader attachment" would result. The connection between the stable streamers and lightning leaders is henceforth referenced as leader attachment. Once leader attachment may be achieved, a full lightning discharge path may be completed, and conditions would now be present for imminent lightning strike occurrences and re-occurrences.

In certain implementations, the systems and methods may reduce the likelihood of lightning strikes upon aircrafts (e.g., airplanes, rotorcrafts, commercial drones, unmanned aerial vehicles, etc.). In such implementations, the inventive aspects provide for the capacity to lessen the likelihood of leader attachment by increasing the energy required for stable streamer formation and lightning leader connection. Specifically, the inventive aspects include aircraft surfaces coated with materials having a dielectric strength above a predefined threshold. Accordingly, when stable streamers would make contact with an aircraft surface coated with such specified material, the charge on the coated aircraft surfaces would be insufficient for lightning strikes to take place.

In some implementations, the systems and methods may reduce the impact of lightning strike upon aircrafts. Advantageously, such systems and methods reduce the likelihood of system failure or physical damage to an aircraft by channeling lightning currents through one or more specific pathways on an aircraft surface where no other systems or wires may be present. Hence, safe passage of the lightning currents and the prevention of lightning damage may be realized.

Referring to FIG. 1, an example aerial system 100 (e.g., aircraft system) implementing a passive lightning avoidance system is shown. As illustrated in FIG. 1, the aircraft system 100 may include one or more aircraft surfaces 110, and a surface coating 120 (i.e., a coating having a "high" dielectric strength, (a coating made of materials above a dielectric threshold). Also, as depicted, the manufactured combination of the surface coating 120 and the one or more aircraft surfaces 110 is shown as the coated surface(s) 130. In certain implementations. the surface coating 120 may at least partially cover (i.e., coat) the one or more aircraft surfaces 110. Advantageously, as shown, the likelihood of a potential leader attachment 180 of a lightning strike episode would be reduced when lightning may come in contact with the surface coating 120 (or coated surface(s) 130).

In FIG. 1, the one or more aircraft surfaces 110 are shown to be in a lightning zone 112. A lightning zone 112 includes regions (the length of "X") of the aircraft surfaces 110 that have the highest likelihood of leader attachment 180) (e.g., significantly above a predetermined leader attachment 180 threshold). In various implementations, the lightning zone 112 and leader attachment threshold 180 may be predetermined based on prior operational lightning data analysis.

In certain implementations, the one or more aircraft surfaces 110 may include different metal materials or one or more composite materials. In some instances, the one or more metal materials may include, but not limited to aluminum, magnesium, titanium, and their respective alloys. Also, in certain instances, the one or more composite materials may include one or more of fiberglass, carbon fiber, or fiber-reinforced matrix systems.

Moreover, such aircraft surfaces 110 may be found on any exterior metal portion (i.e., metal surface) of the aircraft including, but not limited to the fuselage (i.e., body), wings, fins, etc. In certain cases, where the aircraft may be a rotorcraft, the aircraft surfaces may include any exterior metal portion (i.e., metal surface) including, but not limited to the main rotor, the tail boom, tail rotor, etc. In various cases, when in close proximity of a lightning storm, the charging of the aircraft surfaces 110 may be non-uniform. For instance, the surfaces 110 that include sharp edges, such as the nose, tail, discharge wicks, and rotors may be charged much faster and to much higher potentials in comparison to other surfaces.

As illustrated, the surface coating 120 may be formed with one or more materials that are above a dielectric strength threshold (i.e., a dielectric strength level, a "high" dielectric strength). Dielectric strength may correspond to the maximum electric field that a material can withstand without experiencing failure of its insulating properties. Hence, dielectric strength may be defined as the maximum voltage required to breakdown a specific material (as expressed in terms of volts per unit thickness (e.g., megavolts per meter MV/m). The higher the level of dielectric strength, the higher the quality of the insulator, and thus, the capability of the surface coating 120 to withstand or resist the passage of electric current. (i.e., prevent electrical conductivity). In various implementations, the surface coating 120 may be formed one or more materials having dielectric strength thresholds above 30 kV/mm. Advantageously, such a threshold would be an order of magnitude higher than that of plain air at an operating altitude.

In certain cases, the surface coating 120 may be based on the permittivity of its materials. In electromagnetics, permittivity is a measure of the electric polarizability of a dielectric. For instance, a material with high permittivity would polarize to a greater extent in response to an applied electric field than a material with low permittivity, thereby storing more energy in the electric field. Thus, in various implementations as described herein, electric permittivity would measure how well molecules of the surface coating 120 align (i.e., polarize) under an electric field. Accordingly, the lower the electric permittivity, the worse the molecules polarize; and hence, the more likely the surface coating 120 would be able to resist an external electric field of a lightning strike episode.

In certain implementations, the surface coating 120 may include one or more materials such as one or more of polystyrene, polyethylene, a combination of both and mica-reinforced plastic, or a "high" dielectric strength material (i.e., a metal oxide that is above the dielectric threshold) such as alumina, silica, and magnesium oxide. In various cases, the one or more materials may be chosen based on the operating flight conditions of the aircraft (e.g., altitude and icing conditions) and the travel terrain conditions (e.g., desert terrain) as sand and ice may damage certain polymeric materials.

In various cases, the one or more materials (above the dielectric strength threshold) may be coated (i.e., surface coating 120) on to the aircraft surfaces 110 by one of spin coating, dip coating, or sputtering. Next, the surface coating 120 may then be sintered and/or annealed to form a uniform film. By doing so, uniformity may be ensured as well as a reduction of microscopic defects. When sintered, the surface coating 120 (or coated surfaces 130) may undergo a process of compacting and forming into a solid mass of material by heat or pressure without melting to the point of liquefaction. When annealed, the surface coating 120 (or coated surfaces 130) may be heated and allowed to cool slowly, in order to remove internal stresses and toughen the material comprising the surface coating 120 (or coated surfaces 130).

Advantageously, systems and methods as described with reference to FIG. 1 provide for the surface coating 120 (or in combination, coated surfaces 130) to repel leader attachment 180. Due to the high dielectric strength of the surface coating 120 (or coated surfaces 130), for formation of stable streamers, a lightning strike would have to overcome a greater energy threshold in comparison to uncoated metal/composite surfaces. Advantageously, such materials would allow for surface permittivity to be increased by over two-hundred times. Accordingly, the surface coating 120 (or coated surfaces 130) would make it more difficult for ionized plasma columns/channels to form and leader attachment to occur, and such plasma channels would then seek more energetically favorable pathways for discharge to ground. Also, in addition, such systems and methods would require minimal exterior surface modification; thus, resulting in negligible aircraft aerodynamics.

Figure 2:
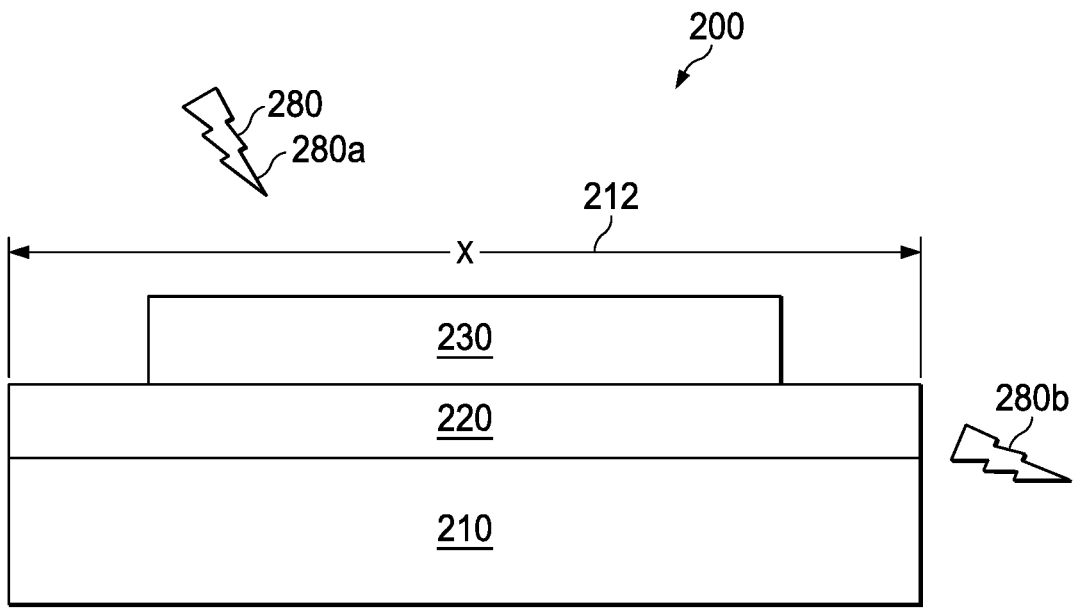
FIG. 2 illustrates a diagram in accordance with implementations of various techniques described herein.

Referring to FIG. 2, an example aerial system 200 (e.g., aircraft system) implementing lightning channeling and mitigation systems of an aircraft is shown. In one example, as illustrated, the aerial system 200 may include one or more aircraft surfaces 210, one or more metal meshes 220 (i.e., electromagnetic shields, metal meshes), and one or more metal oxide materials (i.e., varistor materials, metal oxide varistor (MOV) layer) 230. As shown, in certain implementations, the metal oxide materials 230 may be placed on or above (e.g., at least partially coating) the metal meshes 220, while the metal meshes 220 may be placed on (e.g., bonded with, embedded through, affixed on) or above the one or more aircraft surfaces 210. Also shown in FIG. 2, a leader attachment 280*a* of a lightning strike 280 may strike the aircraft at the MON/layer 230, but an electrostatic discharge 280*b* of the lightning strike 280 may be safely conducted on the aircraft through the metal meshes 220.

Similar to FIG. 1, in FIG. 2, the one or more aircraft surfaces 210 are shown to be in a lightning zone 212. A lightning zone 212 includes regions (the length of "X") of the aircraft surfaces 210 that have the highest likelihood of leader attachment 280) (e.g., significantly above a predetermined leader attachment 180 threshold). In certain examples, as shown in FIG. 2, the one or more metal oxide materials 230 may be placed solely on the aircraft surfaces 210 that are deemed to be in the lightning zone 212. In various implementations, the lightning zone 212 and leader attachment threshold 280 may be predetermined based on prior operational lightning data analysis.

Furthermore, the one or more aircraft surfaces 210 may include one or more composite materials. Accordingly, the one or more composite materials may include one or more of fiberglass, carbon fiber, or fiber-reinforced matrix systems.

Moreover, such aircraft surfaces 210 may be found on any exterior portion (i.e., metal surface) of the aircraft including, but not limited to the fuselage (i.e., body), wings, fins, etc. In certain cases, where the aircraft may be a rotorcraft, the aircraft surfaces may include any exterior portion including, but not limited to the main rotor, the tail boom, tail rotor, etc.

The one or more metal meshes 220 (e.g., metal webbing, metal net, metal skin, meshes) may include a barrier made from connected strands of metal. The connected strands of metal may be woven, knitted, or welded together to form the one or metal meshes 220. In various implementations, the one or more metal meshes 220 may be partially embedded within (e.g., positioned through) or affixed upon (e.g., attached to) the one or more aircraft surfaces 210. Advantageously, such meshes 220 may be positioned to receive lightning current from the MOV layer 230 and direct the lightning current away from critical aircraft electrical systems and wiring.

The one or more metal oxide materials 230 (i.e., varistor materials) may form into (e.g., function as) varistors (i.e., a metal oxide varistor (MOV) layer). In certain implementations, the metal oxide materials 230 may include one or more voltage dependent resistors. Such resistors may include material of metallic oxide (e.g., primarily zinc-oxide (ZnO) pressed into a ceramic-like material). In certain implementations, the metal oxide materials 230 may include zinc-oxide (approximately 90%) as a ceramic base material and other filler materials for the formation of junctions between the zinc-oxide grains.

The one or more metal oxide materials 230 may operate as an insulator in proximity or connection with ambient electric fields, but would "break down" rapidly and operate as a conductor in proximity or connection with electric fields above a certain threshold (e.g., approximately 3-35 kV/mm for sintered zinc oxide nanoparticles) during a lightning strike episode.

In operation, by placing (e.g., at least partially coating) the one or more meshes 220 with metal oxide materials 230 (that can form varistors) (in predetermined lightning zone regions of the aircraft) and "bonding" the metal meshes 220 with the aircraft surfaces 210 (for electromagnetic shielding), lightning energy may be channeled safely on the metal meshes 220 and not damage the aircraft surfaces 210. Specifically, upon a lightning strike episode, a "short" would be generated between the one or more metal oxide materials 230 and the one or more metal meshes 220, such that a lightning energy would be transferred from the one or more metal oxide materials 230 to the one or more metal meshes 220.

Advantageously, inventive aspects reduce the likelihood of system failure or physical damage to an aircraft by channeling lightning currents through one or more specific pathways on an aircraft surface where no other systems or wires may be present. Hence, safe passage of the lightning currents and the prevention of lightning damage may be realized. Moreover, by providing for only certain conductive paths (e.g., on the one or more metal meshes 220) on an aircraft, the inventive concepts may reduce aircraft weight requirement. Accordingly, in utilizing such inventive concepts, metal material may be removed from aircrafts where lightning current would be known not to flow. Moreover, as lightning-induced electromagnetic compatibility (EMC) issues may be minimized, a greater flexibility for aircraft electrical systems and wiring design may also be achieved.

Figure 3:
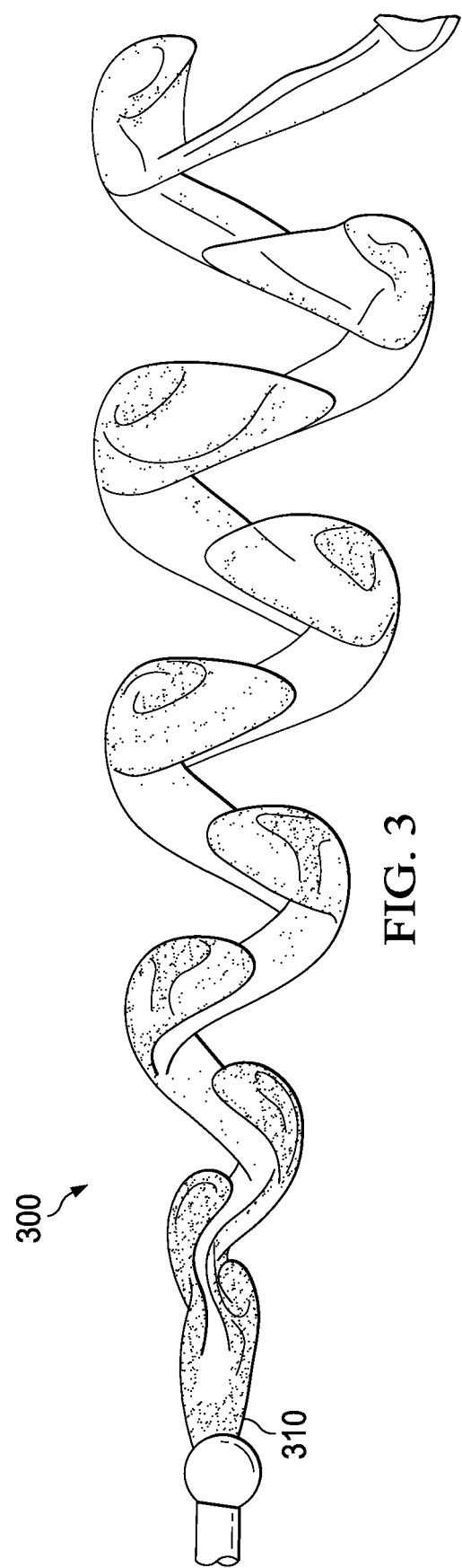
FIG. 3 illustrates a diagram in accordance with implementations of various techniques described herein.

Referring to FIG. 3, a diagram (i.e., a visualization) of the Kármán vortex street 300 is shown. The Kármán vortex street 300 is a repeating pattern of swirling vortices, caused by a process known as vortex shedding. Vortex shedding would be responsible for the unsteady separation of flow of a fluid around blunt bodies. Also, as shown in FIG. 3, the point at where vortex shedding would commence is known as the Kármán vortex point 310. As observed and verified through modeling, the Kármán vortex street 300 may correspond to charging theory in the development of lightning strikes. For example, charge (i.e., charged particles) may build up in clouds due to convection in the atmosphere. Moreover, discharge would be initiated by a local drop in electric field permittivity caused by air flow patterns.

Figure 4:
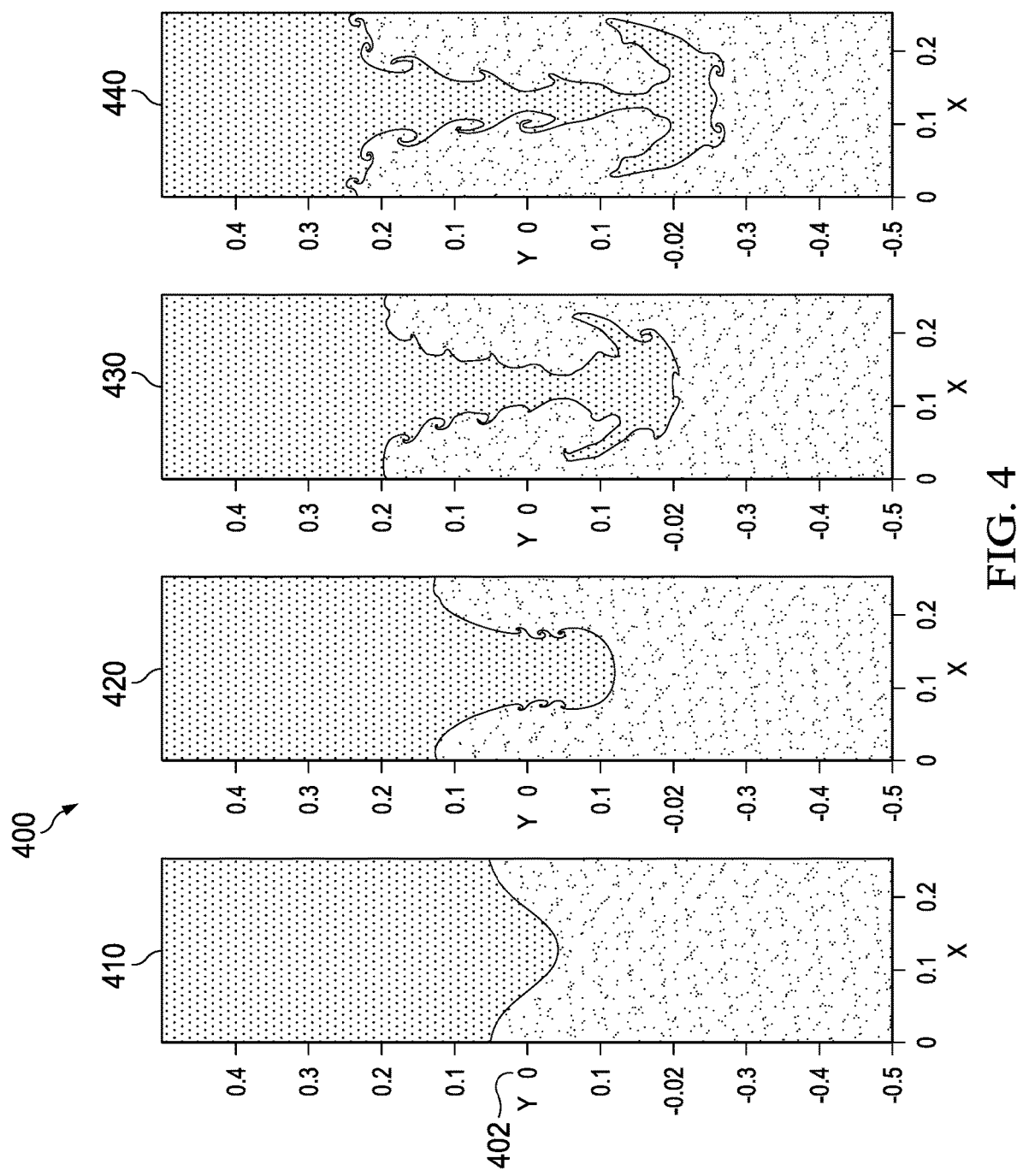
FIG. 4 illustrates a diagram in accordance with implementations of various techniques described herein.

Referring to FIG. 4, a sequence of cartesian graphs 400 illustrating a hydrodynamics simulation of Rayleigh-Taylor instability (i.e., RT instability) is shown. RT instability is an instability of an interface between two fluids of different densities that may occur when a lighter fluid is pushing a heavier fluid. One example of RT instability behavior may include water suspended above oil. As shown in FIG. 4, the simulation shows cartesian graphs 410, 420, 430, and 440 each illustrating successive stages (i.e., snapshots, frames) in a sequence. In each of the cartesian graphs 410-440 (i.e., graphs), a y-component is shown from 0.4 to −0.5 and an x-component from 0 to 0.2. As depicted, the X and Y components may be arbitrary units of length, proportional to the magnitude of the disturbing field (e.g., in the case of fluids, for pressure gradients; in the case of fields, for potential or electric-fields; and in the case of lightning, a combination of the pressure drop created by the movement of layers of air against each other and against the cloud particles and the local electric field caused by the charge separation between the cloud and the ground). Correspondingly, for lightning, the X and Y components may be in units of tens of meters (m).

As observed and verified through modeling, the instability behavior may also correspond to the movement of charged particles in air. Accordingly, the charged particles in clouds would flow through regions in the air where they may seek out oppositely charged surfaces/ground. The movement of these charges may be in the form of thin filaments (i.e., streamers). In the case of lightning, the primary branch is called a leader. Of note, with references to the graphs 410-440, at the Karman Vortex point 402 (i.e., initially at y=0 in FIG. 410), the RT instability can be one underlying cause for the commencement of leader formation (i.e., the progression of streamers).

Figure 5A:
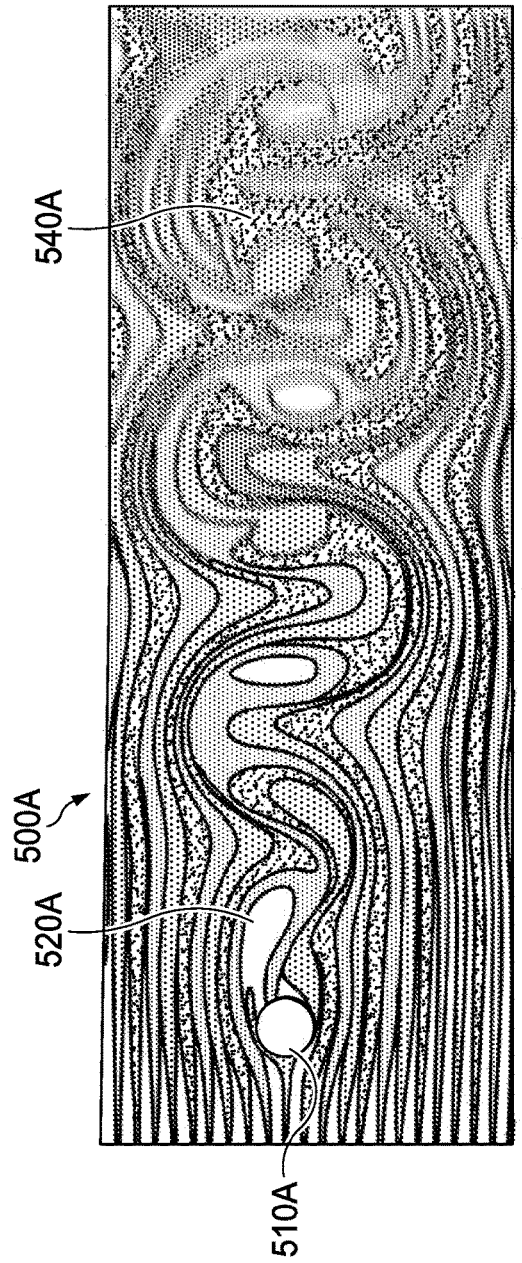
FIGS. 5A-5B illustrate diagrams in accordance with implementations of various techniques described herein.
Figure 5B:
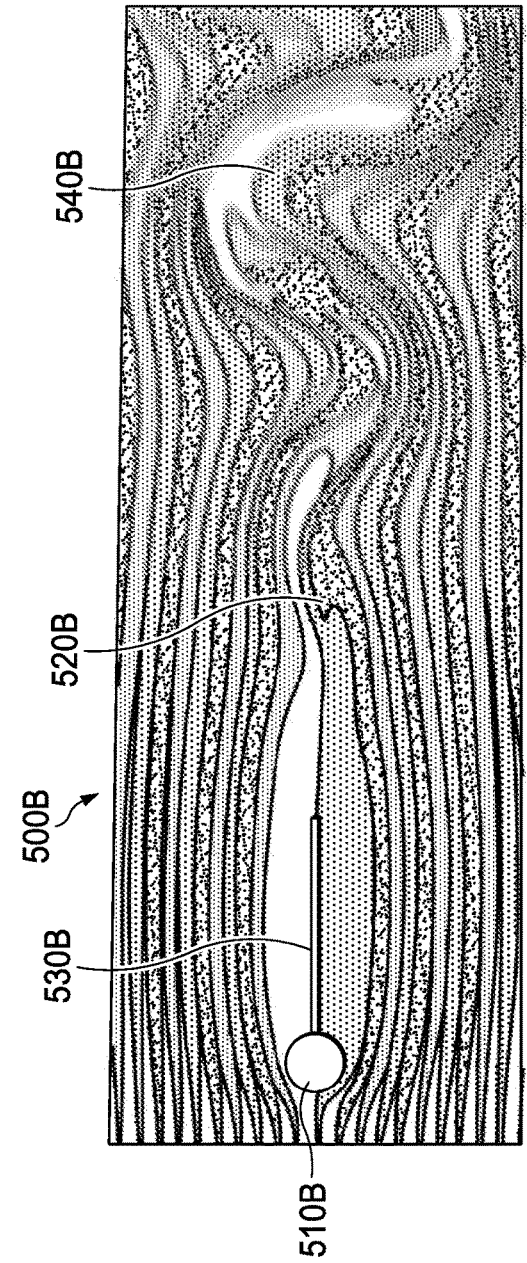

Referring to FIGS. 5A and 5B, two diagrams (500A, 500B) of plasma channels are shown. In two different representations, FIGS. 5A and 5B depict plasma channel leaders (510A, 510B) (i.e., an ionized column, tip, leader) represented along with, at 520A, 520B, and the plasma channel when stabilized. FIG. 5B further depicts the tail 530B of the leader 510B. Also depicted, is the plasma channel collapse (i.e., spreading), at 540A, 540B, in the absence of electric and magnetic fields.

In various implementations, specifically, the leader (e.g., 510A, 510B) may be formed in clouds where an electric field may be "high enough" to sustain breakdown (according to the Paschen curve where the altitude may determine the dielectric strength of the air (e.g., breakdown voltage (V) vs. pressure×gap (Torr inches)). In certain examples, water droplets may breakdown at 900 kV/m and ice crystals may breakdown at 500 kV/m. In instances of negative flash discharge, the leader may take a zig-zag path, in steps of 50 m and pauses of 20-100 μs. Further, negative flashes may discharge several charge centers in succession. Accordingly, there may be distinct pulses in current that can cause initial and subsequent return strokes.

Further attributes of leaders (e.g., 510A, 510B) include having a diameter between 1 to 10 m, were approximately 100 A current may be concentrated in a highly ionized core having approximately 1 cm diameter. The average velocity of propagation may be $2\times10^5$ m/s. Also, the leader can form branches during propagation. As it nears the ground/surfaces, charge center from objects like aircrafts generate their own "leaders". When the leaders collide, a connection would be established leading to a flash occurrence.

According to inventive aspects described herein, such leaders may be stabilized by fast-moving electric and magnetic fields (e.g., traveling at speeds of 95,000 m/s). Further, discharge can occur when a leader may connect to an oppositely charged streamer. Also, various conductors placed in high charge zones may further tend to cause discharge, and thus release streamers themselves. Moreover, as the plasma columns generated by the leader become stabilized even after first discharge, subsequent discharges become much more likely.

Schemes and techniques described herein (with reference to FIG. 1) provide for the capability to avoid stable streamer formation (or at a minimum, the capability to increase the difficulty of stable streamer formation) through plasma field distortion (i.e., field destabilization). According to certain inventive aspects, plasma channels would collapse when the stabilizing electric and magnetic fields are disrupted. As oscillating electric fields tend to "draw out" charges in the direction of the electric field while oscillating magnetic fields tend to accelerate moving charges in a perpendicular direction, when a certain frequency of oscillation may be attained, the effects of the electric and magnetic fields attaining a "maximum" level of plasma channel distortion lead to a complete collapse of the plasma channels. In certain instances, the maximum level of plasma channel distortion can be defined as the angle whereby the plasma channel would bend away from the trajectory it would originally take in the absence of any perturbing field. For example, a complete plasma channel collapse would happen at 90 degrees or 0.5 Pi radian deflection. For aircraft applications, a collapse of field strength to the point the dielectric breakdown strength of air (at that altitude) would be sufficient. In various implementations, the collapse of field strength may be computed as: E (breakdown) ≥ E (lightning) cos (D) (where D is the distortion/deflection angle). Moreover, such a parameter would also be altitude dependent.

Figure 6:
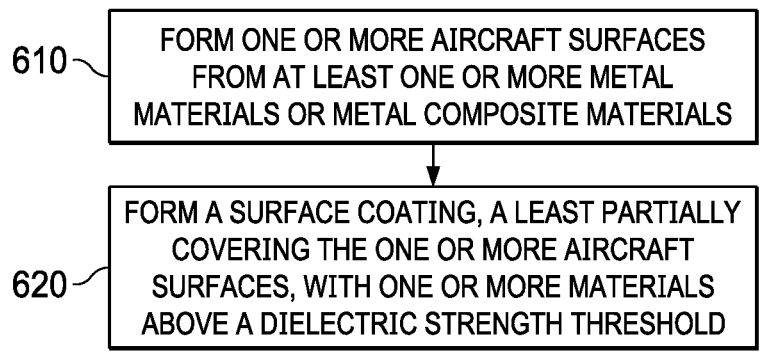
FIG. 6 is a particular illustrative aspect of methods in accordance with implementations of various techniques described herein.

Referring to FIG. 6, a flowchart of an example method 600 (i.e., procedure) for the aircraft system 100 (described with reference to FIG. 1) is shown. Advantageously, the method (of manufacture or fabrication of surfaces of an aircraft) 600 can be utilized to: (1) avoid lightning strikes upon an aircraft or at a minimum, (2) minimize the likelihood of occurrences of lightning strikes.

At block 610, one or more aircraft surfaces may be formed from at least one or more metal materials or metal composite materials. For example, as described with reference to FIG. 1, the one or more aircraft surfaces 110 may be formed from one or more of metal materials such as: aluminum, magnesium, titanium, or alloys of the one or more metal materials; or from one or more composite materials such as: one or more of fiberglass, carbon fiber, or fiber-reinforced matrix systems.

At block 620, a surface coating may be formed at least partially covering the one or more aircraft surfaces with one or more materials above a dielectric strength threshold. For example, as described with reference to FIG. 1, the surface coating 120 of the one or more aircraft surfaces 110 may be formed from one or more high-epsilon materials (i.e., materials above a predetermined dielectric strength threshold) such as one or more of polystyrene, polyethylene, a combination of both and mica-reinforced plastic, or a "high" epsilon metal oxide (i.e., a metal oxide that is above the dielectric strength threshold).

Also, according to another aspect of the manufacturing method, forming the surface coating further includes applying, by one spin coating, dip coating, or sputtering, the surface coating to the one or more aircraft surface. For example, as described with reference to FIG. 1, the the surface coating 120 may be formed by applying the one or more materials above the dielectric strength threshold to the one or more aircraft surface 110 through either spin coating, dip coating, or sputtering.

Further, according to another aspect of the manufacturing method, forming the surface coating further includes sintering or annealing the surface material 120 to form a uniform film. For example, as described with reference to FIG. 1, the surface coating 120 may be sintered or annealed to form a uniform film and remove microscopic imperfections.

Figure 7:
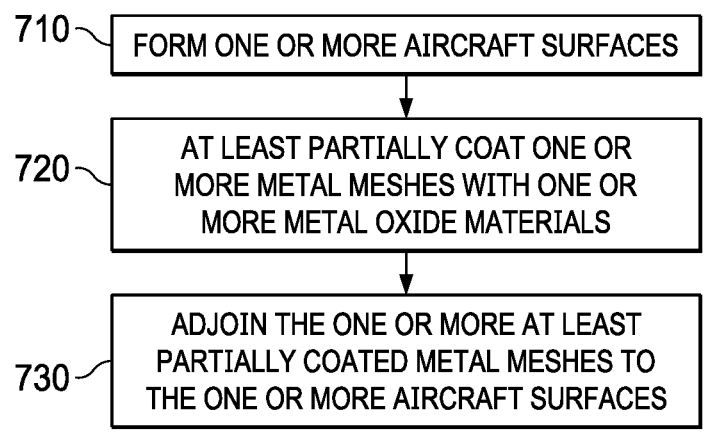
FIG. 7 is a particular illustrative aspect of methods in accordance with implementations of various techniques described herein.

Referring to FIG. 7, a flowchart of an example method 700 (i.e., procedure) for the aircraft system 200 (described with reference to FIG. 2) is shown. Advantageously, the method 800 of fabrication can channel (i.e., route) current safely on surfaces of an aircraft.

At block 710, one or more aircraft surfaces may be formed. For example, as described with reference to FIG. 2, the one or more aircraft surfaces 210 may be formed from one or more composite materials such as: one or more of fiberglass, carbon fiber, or fiber-reinforced matrix systems.

At block 720, the one or more metal meshes may at least be partially coated with one or more metal oxide materials. For example, as described with reference to FIG. 2, the one or more metal meshes 220 may at least be partially coated with one or more metal oxide materials 230 (i.e., varistor materials). In certain implementations, the metal oxide materials 230 may include one or more voltage dependent resistors. Moreover, such voltage dependent resistors may include material of metallic oxide (e.g., primarily zinc-oxide (ZnO) pressed into a ceramic-like material.

At block 730, the one or more aircraft surfaces may be adjoined to the one or more at least partially coated metal meshes. For example, as described with reference to FIG. 2, the one or more aircraft surfaces 210 may be adjoined to the one or more at least partially coated metal meshes 220 (i.e., metal meshes 220 coated with the one or more metal oxide materials 230).

According to one aspect of the manufacturing method, the one or more aircraft surfaces may be bonded to the one or more metal meshes. For example, as described with reference to FIG. 2, the one or more aircraft surfaces 210 may be bonded to the one or more metal meshes 220.

Further, according to certain aspects of the manufacturing method, the adjoining of the one or more metal meshes comprise either 1) partially embedding the one or more at least partially coated metal meshes to the one or more aircraft surfaces or 2) affixing the one or more at least partially coated metal meshes on to the one or more aircraft surfaces. For example, as described with reference to FIG. 2, the adjoining of the one or more metal meshes 220 comprise either 1) partially embedding the one or more at least partially coated metal meshes 220 to the one or more aircraft surfaces (i.e., meshes 220 coated with the one or more metal oxide materials 230) or 2) affixing the one or more at least partially coated metal meshes 220 on to the one or more aircraft surfaces (i.e., meshes 220 coated with the one or more metal oxide materials 230).

Figure 8:
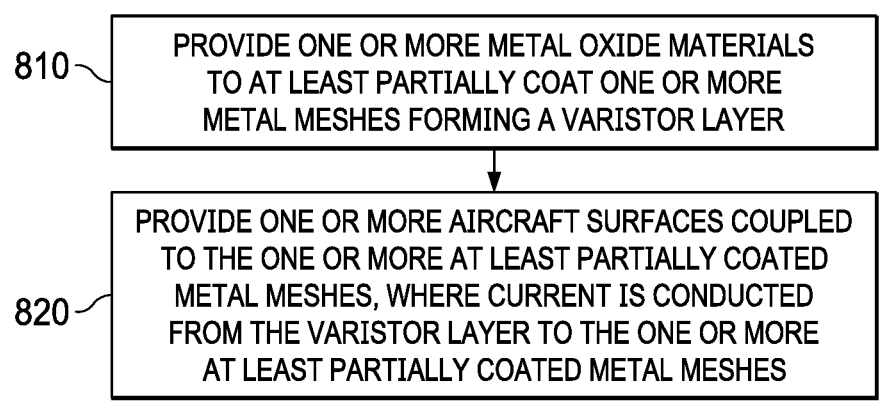
FIG. 8 is a particular illustrative aspect of methods in accordance with implementations of various techniques described herein.

Referring to FIG. 8, a flowchart of an example method 800 (i.e., procedure) for the aircraft system 200 (described with reference to FIG. 2) is shown. Advantageously, the method 800 of (lightning) energy attenuation of an aircraft surface can channel (i.e., route) current safely on surfaces of an aircraft.

At block 810, one or more metal oxide materials may be provided to at least partially coat one or more metal meshes and form a varistor layer. For example, as described with reference to FIG. 2, the one or more metal meshes 220 may be at least partially coated with one or more metal oxide materials 230 (i.e., varistor materials) to form a varistor layer.

At block 820, one or more aircraft surfaces may be provided that are coupled to the one or more at least partially coated metal meshes. Also, current may be conducted from the varistor layer to the one or more at least partially coated metal meshes. For example, as described with reference to FIG. 2, one or more aircraft surfaces 210 may be coupled to the one or more at least partially coated metal meshes 220 (i.e., metal meshes 220 coated with the one or more metal oxide materials 230). Moreover, current (i.e., 280a, 280b) may be conducted from the varistor layer 230 to the at least partially coated one or more metal meshes 220. Advantageously, the current (i.e., 280a, 280b) may be conducted safely on the metal meshes 220 and not on the aircraft surfaces 210.

Each of the processes of illustrative methods 600, 700 may be performed or carried out by a system integrator, a third party, and/or an operator (e.g., an aerodynamicist or an aerospace designer). For the purposes of this description, a system integrator may include, without limitation, any number of manufacturers and major-system subcontractors; a third party may include, without limitation, any number of vendors, subcontractors, and suppliers; and an operator may be a leasing company, military entity, service organization, and so on.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method comprising:
   forming one or more aircraft surfaces;
   at least partially coating one or more metal meshes with one or more metal oxide materials on the one or more aircraft surfaces in a conductive path; and
   adjoining the one or more at least partially coated metal meshes to the one or more aircraft surfaces,
   wherein the one or more metal oxide materials form into varistors.

2. The method of claim 1, wherein adjoining the one or more at least partially coated metal meshes comprise: bonding the one or more metal oxide materials to the one or more metal meshes.

3. The method of claim 1, wherein adjoining the one or more metal meshes comprise: partially embedding the one or more at least partially coated metal meshes to the one or more aircraft surfaces.

4. The method of claim 1, wherein adjoining the one or more metal meshes comprise: affixing the one or more at least partially coated metal meshes on to the one or more aircraft surfaces.

5. The method of claim 1, wherein the one or more aircraft surfaces are determined to be in a lightning zone, wherein the lightning zone comprises regions of the aircraft surfaces significantly above a predetermined leader attachment threshold.

6. The method of claim 1, wherein the one or more aircraft surfaces comprise metal composite materials.

7. The method of claim 1, wherein the varistors comprise one or more voltage dependent resistors.

8. The method of claim 7, wherein the voltage dependent resistors comprise zinc-oxide.

9. The method of claim 1, wherein the one or more metal oxide materials are configured as either insulators or conductors based on an electric field threshold.

10. A method of energy attenuation of an aircraft surface, comprising:
    at least partially coating one or more metal meshes with one or more materials, forming a varistor layer on the one or more metal meshes; and
    providing one or more aircraft surfaces coupled to the one or more at least partially coated metal meshes, wherein current is conducted from the varistor layer to the one or more at least partially coated metal meshes.

11. The method of claim 10, wherein providing the one or more aircraft surfaces coupled to the one or more at least partially coated metal meshes comprises bonding one or more metal oxide materials to the one or more metal meshes.

12. The method of claim 10, wherein providing the one or more aircraft surfaces coupled to the one or more at least partially coated metal meshes comprises partially embedding the one or more at least partially coated metal meshes to the one or more aircraft surfaces.

13. The method of claim 10, wherein providing the one or more aircraft surfaces coupled to the one or more at least partially coated metal meshes comprises affixing the one or more at least partially coated metal meshes on to the one or more aircraft surfaces.

14. The method of claim 10, wherein the one or more aircraft surfaces are determined to be in a lightning zone, wherein the lightning zone comprises regions of the aircraft surfaces significantly above a predetermined leader attachment threshold.

15. The method of claim 10, wherein the one or more aircraft surfaces comprise metal composite materials.

16. The method of claim 10, wherein the varistor layer comprises one or more voltage dependent resistors.

17. The method of claim 16, wherein the one or more voltage dependent resistors comprise zinc-oxide.

18. The method of claim 10, wherein the one or more materials are configured as either insulators or conductors based on an electric field threshold.

* * * * *